(12) United States Patent
Yeang et al.

(10) Patent No.: US 12,730,344 B2
(45) Date of Patent: Sep. 8, 2026

(54) TRANSPARENT METAL MESH ELECTRODE DESIGN FOR REVERSIBLE METAL ELECTRODEPOSITION

(71) Applicants: The Regents of the University of Colorado, a body corporate, Denver, CO (US); The Board of Trustees of the Leland Stanford Junior University, Stanford, CA (US)

(72) Inventors: Andrew L. Yeang, Boulder, CO (US); Tyler S. Hernandez, Boulder, CO (US); Michael T. Strand, Minneapolis, MN (US); Michael D. McGehee, Boulder, CO (US)

(73) Assignees: The Regents of the University of Colorado, a body corporate, Denver, CO (US); The Board of Trustees of the Leland Stanford Junior University, Standford, CA (US)

( * ) Notice: Subject to any disclaimer, the term of this patent is extended or adjusted under 35 U.S.C. 154(b) by 285 days.

(21) Appl. No.: 18/326,784

(22) Filed: May 31, 2023

(65) Prior Publication Data

US 2023/0393441 A1 Dec. 7, 2023

Related U.S. Application Data

(60) Provisional application No. 63/347,983, filed on Jun. 1, 2022.

(51) Int. Cl.

| | |
|---|---|
| ***G02F 1/1506*** | (2019.01) |
| ***G02F 1/155*** | (2006.01) |
| *B33Y 80/00* | (2015.01) |

(52) U.S. Cl.

CPC ............ *G02F 1/1506* (2013.01); *G02F 1/155* (2013.01); *B33Y 80/00* (2014.12)

(58) Field of Classification Search

CPC .... G02F 1/155; G02F 1/1506; G02F 1/13439; G02F 1/1514; G02F 1/15; G02F 1/1508;

(Continued)

(56) References Cited

U.S. PATENT DOCUMENTS

| | | | |
|---|---|---|---|
| 5,903,382 | A | 5/1999 | Tench et al. |
| 6,111,685 | A | 8/2000 | Tench et al. |

(Continued)

FOREIGN PATENT DOCUMENTS

| | | | |
|---|---|---|---|
| GB | 400808 | A * | 11/1933 |
| WO | 2019/018667 | A1 | 1/2019 |

(Continued)

OTHER PUBLICATIONS

Barile et al., "Dynamic Windows with Neutral Color, High Contrast, and Excellent Durability Using Reversible Metal Electrodeposition," Joule, vol. 1, Sep. 6, 2017, pp. 133-145.

(Continued)

*Primary Examiner* — Sharrief I Broome
*Assistant Examiner* — Journey F Sumlar
(74) *Attorney, Agent, or Firm* — Workman Nydegger

(57) ABSTRACT

Design of transparent mesh counter electrodes for use in dynamic window articles capable of reversible metal electrodeposition (RME). Such an RME window may include a transparent conductive electrode, an electrolyte in contact with the electrode, where the electrolyte includes metal cations that can be reversibly electrodeposited onto the electrode, and a mesh counter electrode. The mesh counter electrode includes an electrochemically inert core with a thin metal coating thereover. The thin metal coating can be of the material that is involved in electrodeposition (e.g., a combination of copper and bismuth). The mesh counter electrode is substantially transparent (e.g., transparency of at least about 70%). Such a mesh counter electrode can provide a (Continued)

high capacity (1.5 C/cm$^2$) that provides good durability over numerous tinting and bleaching cycles, with minimal change in coloration efficiency, reflection profile, and electrodeposition metal concentration (e.g., [$Cu^{2+}$]) in the electrolyte.

20 Claims, 8 Drawing Sheets

(58) Field of Classification Search
CPC . G02F 1/1524; B32B 17/06; B32B 17/10513; B32B 17/10036
See application file for complete search history.

(56) References Cited

U.S. PATENT DOCUMENTS

| | | | | |
| --- | --- | --- | --- | --- |
| 6,256,135 | B1 * | 7/2001 | Tench | G02F 1/1506 359/266 |
| 6,301,039 | B1 * | 10/2001 | Tench | G02F 1/163 359/266 |
| 6,552,843 | B1 * | 4/2003 | Tench | G02F 1/1506 359/321 |
| 6,558,231 | B1 | 5/2003 | Taylor | |
| 7,317,106 | B2 | 1/2008 | Warner et al. | |
| 8,062,496 | B2 | 11/2011 | Tomantschger | |
| 9,383,619 | B2 | 7/2016 | Kim et al. | |
| 12,050,389 | B2 | 7/2024 | Strand et al. | |
| 2004/0061919 | A1 * | 4/2004 | Tench | G02F 1/1506 359/265 |
| 2005/0248825 | A1 | 11/2005 | Warren et al. | |
| 2008/0203910 | A1 * | 8/2008 | Reynolds | H10K 59/50 359/266 |
| 2009/0168139 | A1 | 7/2009 | Hayashi et al. | |
| 2010/0252446 | A1 | 10/2010 | Kuzmanovic et al. | |
| 2012/0016504 | A1 | 1/2012 | Gough et al. | |
| 2013/0118775 | A1 * | 5/2013 | Zeng | B82Y 30/00 428/626 |
| 2014/0257073 | A1 | 9/2014 | Machon et al. | |
| 2016/0111223 | A1 * | 4/2016 | Bryant | H10K 71/50 438/98 |
| 2016/0317085 | A1 | 11/2016 | Razavi et al. | |
| 2016/0360970 | A1 | 12/2016 | Tzvieli et al. | |
| 2018/0088362 | A1 | 3/2018 | Kim et al. | |
| 2018/0193644 | A1 | 7/2018 | Annoni et al. | |
| 2020/0142273 | A1 | 5/2020 | Barile et al. | |
| 2020/0363690 | A1 | 11/2020 | Barile et al. | |
| 2022/0128878 | A1 | 4/2022 | Michael et al. | |
| 2022/0338801 | A1 | 10/2022 | Vu et al. | |
| 2023/0323553 | A1 | 10/2023 | Yeang et al. | |
| 2024/0111200 | A1 | 4/2024 | Hernandez et al. | |
| 2024/0329481 | A1 | 10/2024 | Strand et al. | |
| 2025/0298282 | A1 | 9/2025 | Strand et al. | |

FOREIGN PATENT DOCUMENTS

| | | | | |
| --- | --- | --- | --- | --- |
| WO | 2019/099919 | A1 | 5/2019 | |
| WO | WO-2020045550 | A1 * | 3/2020 | H05B 3/34 |
| WO | 2021/086834 | A1 | 5/2021 | |
| WO | 2021/155247 | A1 | 8/2021 | |

OTHER PUBLICATIONS

Hernandez. TS, et al. “Bistable black electrochromic windows based on the reversible metal electrodeposition of Bi and Cu”. ACS Energy letters. Dec. 6, 2017.

International Search Report and Written Opinion received for PCT Patent Application No. PCT/US23/018313 , mailed on Jul. 13, 2023, 9 pages.

International Search Report and Written Opinion received for PCT Patent Application No. PCT/US21/15851, mailed on Jun. 28, 2021, 8 pages.

International Search Report and Written Opinion received for PCT Patent Application No. PCT/US21/56100, mailed on Feb. 17, 2022, 11 pages.

International Search Report and Written Opinion received for PCT Patent Application No. PCT/US23/67746, mailed on Nov. 6, 2023, 9 pages.

McGehee, “Robust Large-Scale Dynamic Windows using Reversible Metal Electrodeposition” osti.gov, Sep. 6, 2021, pp. 25.

Strand, “Dynamic Glass Based on Reversible Metal Electrodeposition,” Dissertation Submitted to the Department of Materials Science and Engineering and the Committee on Graduate Studies of Stanford University, Nov. 2020.

Supplementary European Search Report received for EP Patent Application No. 21747478.2, mailed on Jan. 31, 2024, 8 pages.

Alcaraz, Geoffrey Kirk A., et al. “Thermally-stable dynamic windows based on reversible metal electrodeposition from aqueous electrolytes.” Journal of Materials Chemistry C 6.8 (2018): 2132-2138.

DeFoor, Cassondra L., Joseph F. Jeanetta, and Christopher J. Barile. “Controlling the Optical Properties of Dynamic Windows Based on Reversible Metal Electrodeposition.” ACS Applied Electronic Materials 2.1 (2019): 290-300.

Haataja, Mikko, David J. Srolovitz, and Andrew B. Bocarsly. “Morphological stability during electrodeposition: II. Additive effects. ” Journal of the Electrochemical Society 150.10 (2003): C708.

Hernandez et al., “Electrolyte for Improved Durability of Dynamic Windows Based on Reversible Metal Electrodeposition”, Joule, vol. 4,Jul. 15, 2020, pp. 1501-1513.

International Search Report and Written Opinion received for PCT Patent Application No. PCT/US2020/050532, mailed on Dec. 16, 2020, 11 pages.

Islam, Shakirul M., and Christopher J. Barile. “Dynamic Windows Using Reversible Zinc Electrodeposition in Neutral Electrolytes with High Opacity and Excellent Resting Stability.” Advanced Energy Materials 11.22 (2021): 2100417.

Islam, Shakirul M., Christine N. Fini, and Christopher J. Barile. “Dynamic Windows Based on Reversible Metal Electrodeposition with Enhanced Functionality.” Journal of the Electrochemical Society 166.8 (2019): D333.

Non-Final Office Action received for U.S. Appl. No. 17/506,170, mailed on May 18, 2023, 10 pages.

Strand, Michael T., et al. “Polymer inhibitors enable> 900 cm 2 dynamic windows based on reversible metal electrodeposition with high solar modulation.” Nature Energy 6.5 (2021): 546-554.

Truong et al., “Painometry: Wearable and Objective Quantification System for Acute Postoperative Pain”, MobiSys ’20: Proceedings of the 18th International Conference on Mobile Systems, Applications, and Services. Jun. 2020 [online] < http://mnslab.org/tamvu/paper/2020%20Painometry_Hoang.pdf> <DOI:10.1145/3386901.3389022>.

Yeang et al., “Metal Mesh Design for Dynamic Windows Based on Reversible Metal Electrodeposition”, ECS Meeting Abstracts, Jun. 2, 2022, pp. 1-4.

Yeang, et al., Transparent Metal Mesh Electrode Design for Reversible, May 31, 2023, U.S. Appl. No. 63/347,983.

Eh et al. “A copper-based reversible electrochemical mirror device with switchability between transparent, blue, and mirror states” J. Mater. Chem. C, 2017, 5, 6547 (Year: 2017).

Non-Final Office Action received for U.S. Appl. No. 18/274,858, mailed on Aug. 12, 2025, 14 pages.

Non-Final Office Action received for U.S. Appl. No. 18/298,967, mailed on Aug. 18, 2025, 9 pages.

Non-Final Office Action received for U.S. Appl. No. 18/742,797, mailed on Nov. 6, 2024, 7 pages.

Requirement for Restriction/Election received for U.S. Appl. No. 18/298,967, mailed on Jun. 6, 2025, 5 pages.

Tyler S. Hernandez, Christopher J. Barile, Michael T. Strand, Teresa E. Dayrit, Daniel J. Slotcavage, and Michael D. McGehee. “Bistable Black Electrochromic Windows Based on the Reversible Metal Electrodeposition of Bi and Cu” ACS Energy Letters 2018 3(1), 104-111 (Year: 2018).

Tyler S. Hernandez, Majed Alshurafa, Michael T. Strand, Andrew L. Yeang, Michael G. Danner, Christopher J. Barile, Michael D.

(56) References Cited

OTHER PUBLICATIONS

McGehee, "Electrolyte for Improved Durability of Dynamic Windows Based on Reversible Metal Electrodeposition" Joule, 2020, 4, 7, 1501-1513 (Year: 2020).
Islam et al., "Hybrid dynamic windows using reversible metal electrodeposition and ion insertion", Nature Energy, vol. 4, No. 3, Mar. 2019, pp. 223-229.
Final Office Action received for U.S. Appl. No. 18/298,967, mailed on Mar. 4, 2026, 16 pages.
Kurapova et al "The microstructure and mechanical properties of twinned copper-bismuth films obtained by DC electrodeposition" J . Alloys and Compounds. 2021, 862, 158007 (Year: 2021).
Bradley, "Anodic Dissolution Model Parameterization for Magnetically-Assisted Pulsed Electrochemical Machining (PECM)", 2018, p. 7.
M. Cherkaoui et al., "Pulse plating of Ni-Cu alloys", Surface and Coatings Technology, vol. 34, No. 3, 1988, pp. 243-252.
Ramanauskas et al., "Pulse plating effect on composition and corrosion properties of zinc alloy coatings", Transactions of the Institute of Metal Finishing, 2008, vol. 86, No. 2, pp. 103-108.
Shi et al., " ?-electrochemical selective dissolution surface modification technique for K417G nickel-based superalloy: Prediction model of modified layer thickness", vol. 47, Jul. 2025, 113008.
Verrucchi et al., "Electrodeposition of Sn-Ru Alloys by Using Direct, Pulsed, and Pulsed Reverse Current for Decorative Applications", Materials, Oct. 31, 2024, vol. 17, 5326, pp. 1-11.
Xiao et al., "Atomic-scale understanding of oxide growth and dissolution kinetics of Ni-Cr alloys", Nature Communications, 2025, vol. 16, No. 341, pp. 1-15.
Zhang et al., "Electrochemical dealloying using pulsed voltage waveforms and its application for supercapacitor electrodes", Journal of Power Sources, vol. 257, 2014, pp. 374-379.
Arora et al. "Synthesis of polymethyl methacrylate (PMMA) by batch emulsion polymerization" African Journal of Pure and Applied Chemistry vol. 4(8), pp. 152-157, Aug. 2010 (Year: 2010).
Clark Libretexts Chemistry "2. Strong and Weak Acids" https://chem.libretexts.org/Bookshelves/Physical_and_Theoretical_Chemistry_Textbook_Maps/Supplemental_Modules_(Physical_and_Theoretical_Chemistry)/Equilibria/Acid-Base_Equilibria/2 ._ Strong_and_Weak_Acids, as of 2019. (Year: 2019).
Non-Final Office Action received for U.S. Appl. No. 18/274,858, mailed on Apr. 8, 2026, 16 pages.
Non-Final Office Action received for U.S. Appl. No. 18/298,967, mailed on Jun. 2, 2026, 19 pages.
Final Office Action received for U.S. Appl. No. 18/274,858, mailed on Jul. 28, 2026, 16 pages.

* cited by examiner

Width = $d$

Active area = $dL$

Embedding

Width = $d$, Height = $h$

Active area = $(2h + d)L$

Photolithography, Printing

Diameter = $d$

Active area = $\frac{\pi d}{2}L$

Embossing

Diameter = $d$

Active area = $\pi dL$

Free-standing mesh

TRANSPARENT METAL MESH ELECTRODE DESIGN FOR REVERSIBLE METAL ELECTRODEPOSITION

CROSS-REFERENCE TO RELATED APPLICATIONS

This application claims priority to and the benefit of U.S. Provisional Patent Application Ser. No. 63/347,983 entitled TRANSPARENT METAL MESH ELECTRODE DESIGN FOR REVERSIBLE METAL ELECTRODEPOSITION filed Jun. 1, 2022 and is herein incorporated by reference in its entirety.

STATEMENT REGARDING FEDERALLY SPONSORED RESEARCH

This invention was made with government support under award number 2127308 awarded by the National Science Foundation. The government has certain rights in the invention.

BACKGROUND

Dynamic windows control both the light and heat flow in and out of buildings while maintaining the view through the glass, thus offering both energetic and aesthetic advantages over static controls such as blinds or shades. Implementing dynamic windows in office buildings can improve employee productivity by up to 2% through reduced glare and optimal temperature and lighting control. In addition to the aesthetic advantages, dynamic windows can lead to an average of ~10-20% energy savings over static low-E windows by decreasing energy consumption associated with heating, ventilation, and air conditioning (HVAC).

Over the past several decades, the majority of dynamic window research has focused on electrochromic conductive organic molecules and ion-intercalation based metal oxide electrochromic materials (particularly $WO_3$ and $NiO_x$) that change color upon application of a voltage. Despite the numerous promising advantages of such windows over static lighting controls, they have yet to achieve widespread commercialization due to their inability to simultaneously provide long-term reliability and durability, color-neutral operational characteristics, fast switching on a large-scale, and reasonable cost.

An exciting alternative to electrochromism is reversible metal electrodeposition (RME). These windows operate through the reversible electrochemical deposition of metal on a transparent conducting oxide (TCO) electrode, such as indium tin oxide (ITO), fluorine doped tin oxide (FTO), carbon nanotube, etc. Such windows include an electrolyte between the electrodes, with solubilized, nearly colorless metal cations that can be reduced upon application of a cathodic potential to the TCO to induce optical tinting. While "transparent" is typically used herein for simplicity in describing the electrode, it will be appreciated that the scope includes translucent materials as well.

Reversing the polarity oxidizes the metallic film, effectively stripping it back into the electrolyte, thus allowing the window to return to its initial transparent state. Pt nanoparticles adhered to the ITO surface serve as an enhanced metal nucleation seed layer to allow for uniform metal electrodeposition on a large scale without significantly affecting the transmissivity or conductivity of the electrode. However, the windows do not necessarily need this noble metal modification layer. Such windows promise the potential to switch between transparent and color-neutral opaque states in under a minute over thousands of cycles.

For any dynamic "smart" window technology to show viability in the market, it must be durable enough to last at least 20-30 years without signs of degradation. While some academic research groups have employed RME for optical switching devices, these have typically been for reversible mirrors, small-scale pixel displays, or electronic paper applications. In addition to durability and cost effectiveness, any viable RME window must also be scalable to a sufficiently large size (e.g., 1 $m^2$ or more) for use in window applications, should achieve neutral color transmission characteristics across the applicable tinting spectrum, should provide fast switching speed, and the ability to provide zero or near zero transmission, so as to provide a full blackout privacy state when fully tinted.

SUMMARY

The present disclosure is directed to the design of transparent mesh counter electrodes for use in dynamic window articles capable of reversible metal electrodeposition (RME). By way of example, such an RME window may include a transparent or translucent conductive electrode, an electrolyte in contact with the transparent or translucent conductive electrode, where the electrolyte includes metal cations that can be reversibly electrodeposited onto the transparent or translucent conductive electrode, and a mesh counter electrode. The mesh counter electrode as described herein provides for high transparency, low haze, and low sheet resistance, while providing improved durability over a simple mesh electrode formed of copper. In an embodiment, the mesh counter electrode includes an electrochemically inert core (the core material is not the same metal as is involved in electrodeposition) with a thin metal coating thereover. The thin metal coating can be of the material that is involved in electrodeposition (e.g., a combination of copper and bismuth, or other metals that are inherent to the RME process in the electrolyte). The mesh counter electrode is substantially transparent (e.g., transparency of at least 70%, 75%, or at least about 80%). Such a mesh counter electrode can provide a high capacity (e.g., 1.5 $C/cm^2$, or depending on the capacity requirements for the window's performance) Cu—Bi layer (or another metal layer that is inherent to the RME process in the electrolyte) that provides good durability over numerous tinting and bleaching cycles, with minimal change in coloration efficiency, reflection profile, and electrodeposition metal concentration (e.g., $[Cu^{2+}]$) in the electrolyte.

In an embodiment, the mesh counter electrode includes wires that are substantially cylindrical, rather than planar in shape.

The mesh counter electrode may provide a high charge capacity, e.g., of at least 1 $C/cm^2$, at least 1.2 $C/cm^2$, at least 1.3 $C/cm^2$, at least 1.4 $C/cm^2$ or at least 1.5 $C/cm^2$.

In an embodiment, the inert core of the mesh counter electrode may comprise stainless steel, although other materials may also be used (e.g., copper, aluminum, or other materials noted herein). Because it can be difficult to electroplate or otherwise deposit the desired electrodeposition metals (e.g., copper and/or bismuth) onto stainless steel and some other materials, (due to the formation of an exterior oxide layer), the core can be coated with an intermediate coating, e.g., with a noble metal (that does not participate in the electrodeposition reaction of the window) such as gold. Such a gold or similar coating allows the subsequently applied copper and bismuth (or other electrodeposition metal(s)) to adhere strongly to the wire mesh. Such an intermediate coating layer may also be beneficial where the core material would otherwise be electrochemically active.

In an embodiment, the electrolyte does not include redox shuttles (e.g., 3 $Br^- \leftrightarrows Br_3^-$), which reaction is colored, and thus would interfere with the desired color neutrality. Similarly, in an embodiment the counter electrode does not employ ion intercalation (e.g. $Li^+$ intercalation into $NiO_x$), as slight coloration is associated with such materials in their "clear" state.

In an embodiment, the mesh counter electrode is a free-standing mesh electrode. Alternative forms or methods of formation are possible, such as a woven structure, photolithography, a printed mesh material formed through a subtractive printing process, a printed mesh material formed through an additive process, or the like. In an embodiment, the wires of the mesh counter electrode are relatively thin, e.g., less than 50 μm, less than 40 μm, or no more than about 30-35 μm. Even smaller wire thicknesses may be possible. For example, a 10 μm wire thickness is effectively invisible to the human eye, without magnification.

In an embodiment, the mesh counter electrode provides a figure of merit (FOM) of at least 350, at least 500, or at least 1000. Those of skill in the art will appreciate that FOM is an evaluative measurement between direct current conductivity, and optical conductivity at 550 nm. By way of example, the stainless steel core mesh counter electrodes described herein, which include a noble metal intermediate layer, and a copper, bismuth coating provide a FOM value of about 1300, far higher than the typical industry standard minimum of 350.

In an embodiment, the mesh counter electrode provides low haze, e.g., less than 5%, less than 4%, less than 3%, less than 2%, or less than 1%. By way of example, the stainless steel core mesh counter electrodes described herein, which include a noble metal intermediate layer, and a copper, bismuth coating provide a haze value of about 0.8%.

In an embodiment, the mesh counter electrode provides low sheet resistance, e.g., less than 5 $\Omega\,\square^{-1}$, less than 4 $\Omega\,\square^{-1}$, less than 3 $\Omega\,\square^{-1}$, or no more than about 2 $\Omega\,\square^{-1}$. By way of example, the stainless steel core mesh counter electrodes described herein, which include a noble metal intermediate layer, and a copper, bismuth coating provide a sheet resistance value of about 2 $\Omega\,\square^{-1}$).

An exemplary method includes providing a mesh counter electrode, wherein the mesh counter electrode is formed of an electrochemically inactive material, and striking the mesh counter electrode with a metal. Further, the method includes applying (e.g., deposited via electrolytic, electroless, and/or immersive mechanisms) at least one cation onto the striked mesh counter electrode. Application of the striking material may similarly be achieved through any desired mechanism (e.g., electrolytic, electroless, and/or immersive mechanisms)

In an embodiment, the electrochemically inactive material is stainless steel, or another metal (e.g., copper, aluminum, or another metal). In an embodiment, the metal that is striked onto the mesh counter electrode is a noble metal such as gold. In an embodiment, the at least one cation is copper, bismuth, or a combination thereof.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

The present disclosure is directed to the design of transparent mesh counter electrodes for use in dynamic window articles capable of reversible metal electrodeposition (RME).

Disclosed embodiments of an RME window may include a transparent or translucent conductive electrode, an electrolyte in contact with the transparent or translucent conductive electrode, where the electrolyte includes metal cations that can be reversibly electrodeposited onto the transparent or translucent conductive electrode, and a mesh counter electrode. In an embodiment, the mesh counter electrode includes an electrochemically inert core (e.g., where the core material is not the same metal as is involved in electrodeposition) with a thin metal coating thereover. The thin metal coating can include the material that is involved in electrodeposition (e.g., a combination of copper and bismuth). The mesh counter electrode is substantially transparent (e.g., transparency of at least 70%, 75%, or at least about 80%).

Disclosed embodiments may provide a variety of advantages. For example, the mesh counter electrode as described herein provides for high transparency, low haze, and low sheet resistance, while providing improved durability over a simple mesh electrode formed of copper. Such a mesh counter electrode can provide a high capacity (1.5 $C/cm^2$) Cu—Bi layer that provides good durability over numerous tinting and bleaching cycles, with minimal change in coloration efficiency, reflection profile, and electrodeposition metal concentration (e.g., $[Cu^{2+}]$) in the electrolyte.

Figure 1:
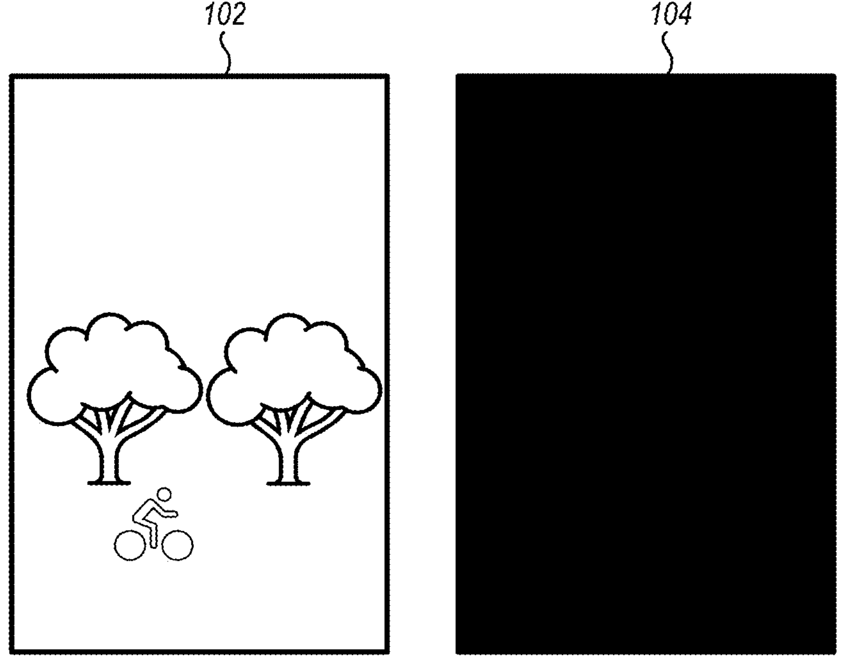
FIG. 1 illustrates an example embodiment incorporated into a dynamic smart window.

FIG. 1 illustrates an example of a disclosed embodiment implemented in a dynamic smart window. As shown in FIG. 1, the transparency of the dynamic smart window may adaptively change between a clear state 102 and a privacy state 104. In some embodiments the privacy state 104 of the dynamic smart window may have a visible light transmission that is as low as about 0.1% visible light transmission (VLT). In other embodiments, the privacy state 104 may have a VLT value that is less than about 0.1% VLT or more than about 0.1% VLT (e.g., 1%, 0.5%, 0.05%, 0.01%, etc.). In an embodiment, the dynamic smart window is a reversible metal electrodeposition (RME) device.

The RME device may include a working electrode, an electrolyte solution, and a counter electrode. Embodiments may use a transparent conducting oxide (TCO) working electrode. The TCO may comprise indium tin oxide (ITO) and fluorine tin oxide (FTO) on a glass or flexible substrate. In embodiments, the electrolyte solution may include water and at least one of $Cu(ClO_4)$, $BiOClO_4$, $HClO_4$, or $LiClO_4$. In some embodiments, the electrolyte solution additionally includes poly(vinyl) alcohol (PVA). To effectively reach a privacy state, RME devices such as contemplated herein shuttle about 150 mC $cm^{-2}$ between the working electrode and the counter electrode. Therefore, it is important that the counter electrode provide enough capacity to charge balance the working electrode reaction while maintaining high transparency and low haze in the dynamic window. The presently described mesh counter electrodes are capable of achieving such.

Mesh counter electrodes may be suitable as transparent electrodes and can be configured to have high transmissivity and low resistivity as well as high charge capacity. Additionally, mesh counter electrodes as described herein provide simplicity in RME devices by allowing the same materials to be reversibly electroplated on both the working electrode and counter electrode.

Figure 2:
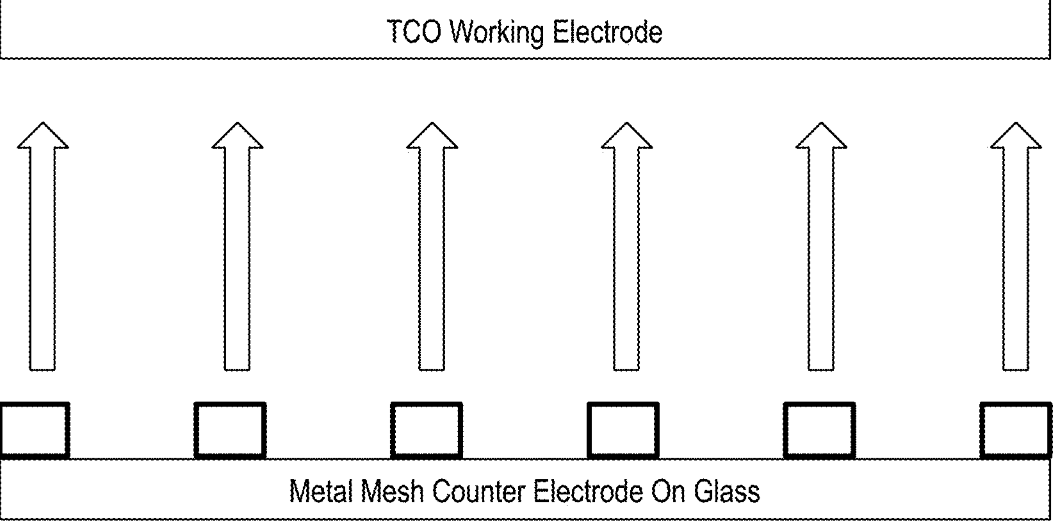
FIG. 2 illustrates an example schematic of a working electrode and counter electrode.

FIG. 2 illustrates an exemplary schematic for ion diffusion in the RME device. In more detail, FIG. 2 illustrates an exemplary TCO working electrode and a metal mesh counter electrode on a glass substrate. When a voltage is applied, the metal ions diffuse towards the TCO and create a uniform plating across the working electrode. The presently described embodiments also allow the reversible flow of the metal ions to diffuse towards the metal mesh counter electrode. The reversibility of the RME device allows the device to oscillate between a clear transparent state and a privacy state (as well as anywhere in between).

Figure 3:
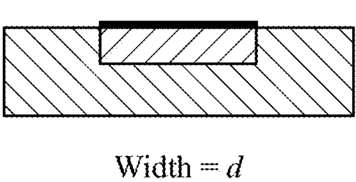
FIG. 3 illustrates an example schematic of mesh geometries.
Figure 3:
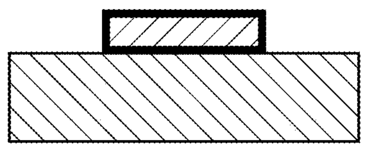
Figure 3:
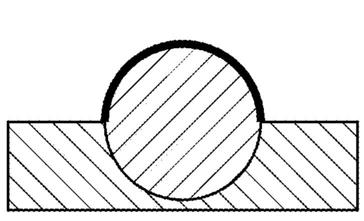
Figure 3:
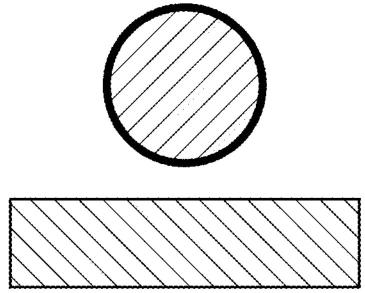

FIG. 3 illustrates various metal mesh geometries. Embodiments may utilize an embedded, photolithography, embossing, or free standing mesh geometry. Additionally, FIG. 3 illustrates an active area shown by the bolded line and calculated by the equations shown in FIG. 3 where L is the length of the electrode. In some embodiments, the free standing mesh geometry was found to be particularly advantageous. The free standing mesh has the fastest bleaching speed and can limit the rate at which the window bleaches. As shown, the free standing mesh geometry has the largest active area compared to the other geometries.

In some embodiments, the mesh counter electrode can be formed of various materials. Non-limiting, exemplary materials were investigated, as shown in Table 1 below.

TABLE 1

| Mesh Material | Conductivity ($S\ m^{-1}$) | Standard Reduction Potential (V vs. SHE) | Raw Metal Cost ($/kg) | Availability as a Mesh |
|---|---|---|---|---|
| Cu | $5.96 \times 10^7$ | 0.337 | 11.00 | Commercially Available |
| Stainless Steel | $1.45 \times 10^6$ | NA | 4.60 | Commercially Available |
| Ni | $1.43 \times 10^7$ | −0.25 | 22.60 | Commercially Available |
| Zn | $1.69 \times 10^7$ | −0.7618 | 3.60 | Not Commercially Available |
| Bi | $7.75 \times 10^5$ | 0.308 | 7.70 | Not Commercially Available |
| Pb | $4.55 \times 10^6$ | −0.126 | 2.30 | Toxic |
| Ag | $6.30 \times 10^7$ | 0.7996 | 732.00 | Commercially Available |
| Au | $4.10 \times 10^7$ | 1.83 | 58,088.00 | Not Commercially Available |
| Al | $3.50 \times 10^7$ | −1.662 | 2.24 | Commercially Available |

Each material in Table 1 is conductive. Many of the materials are highly conductive, offering low sheet resistance. While stainless steel is conductive, many of the other listed materials offer an electrical conductivity that is an order or magnitude higher than the conductivity of stainless steel. Such materials having greater conductivity may be particularly advantageous, particularly when used at commercial scale applications. When choosing a material for the mesh counter electrode, the conductivity, redox properties, raw material cost, and commercial availability are taken into account. Additionally, the standard reduction potential of a selected material should be more positive than metals deposited on the mesh material, to result in an inert mesh material. This is in the case of not having a strike material that fully electrically insulates the core metal. Embodiments may use any of the materials listed in Table 1 (e.g., copper, stainless steel, nickel, zinc, bismuth, lead, silver, gold or aluminum), or other suitable metals or other conductive materials that will be apparent to those of skill in the art. That said, in an embodiment, use of a copper and/or aluminum mesh or a stainless steel mesh can be particularly advantageous.

Figure 4:
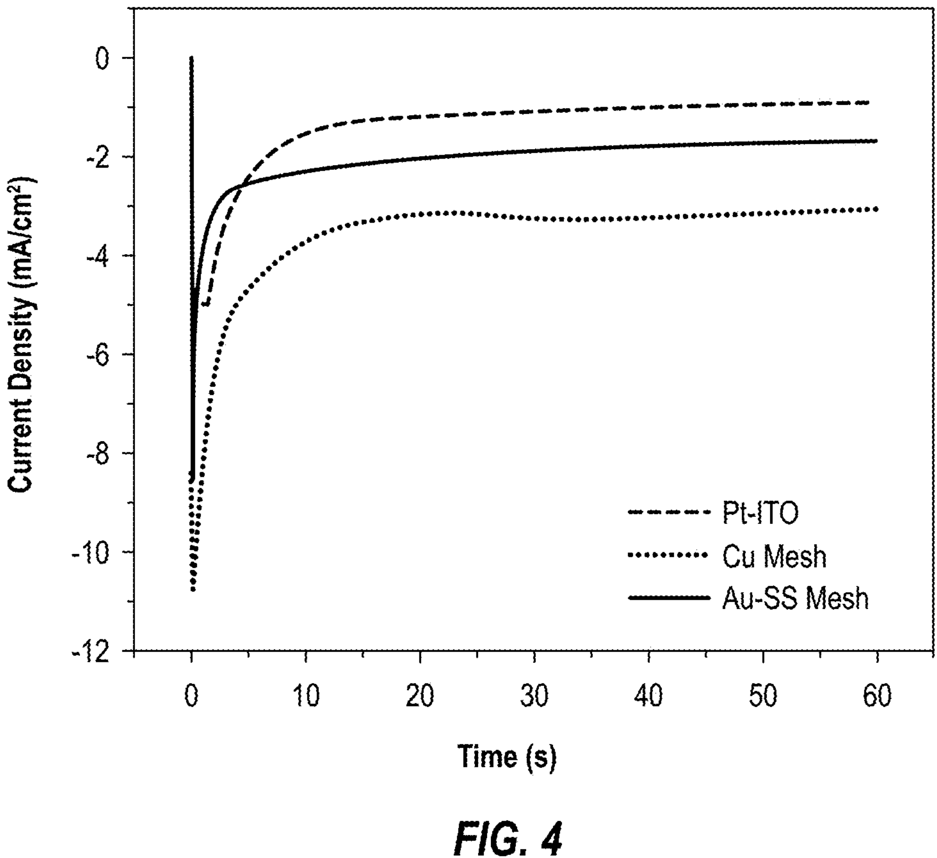
FIG. 4 plots experimental current density values over time for different counter electrodes.

FIG. 4 illustrates experimental results showing the current density per square area vs time for half cells plating copper and bismuth onto different counter electrodes. In more detail, a Pt-ITO electrode, a copper mesh counter electrode, and a gold coated stainless steel mesh counter electrode were used in FIG. 4 and the metal deposition was induced at −0.7 V vs. Ag/AgCl for 1 minute. In the experiment, the electrolyte used contained 1 M $LiClO_4$, 10 mM $HClO_4$, 10 mM $Cu(ClO_4)_2$, 10 mM $BiOClO_4$, and 0.1 weight per volume percent of PVA. As shown, copper mesh and the gold coated stainless steel mesh counter electrodes drew more current than the Pt-ITO electrode due to their cylindrical geometry.

Figure 5B:
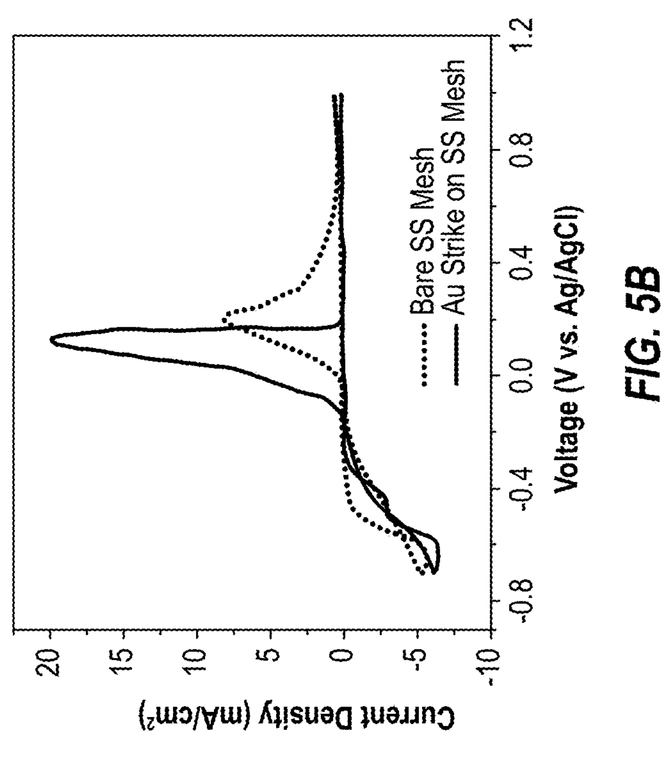
FIGS. 5A and 5B plot experimental current density versus voltage results for different counter electrodes.
Figure 5A:
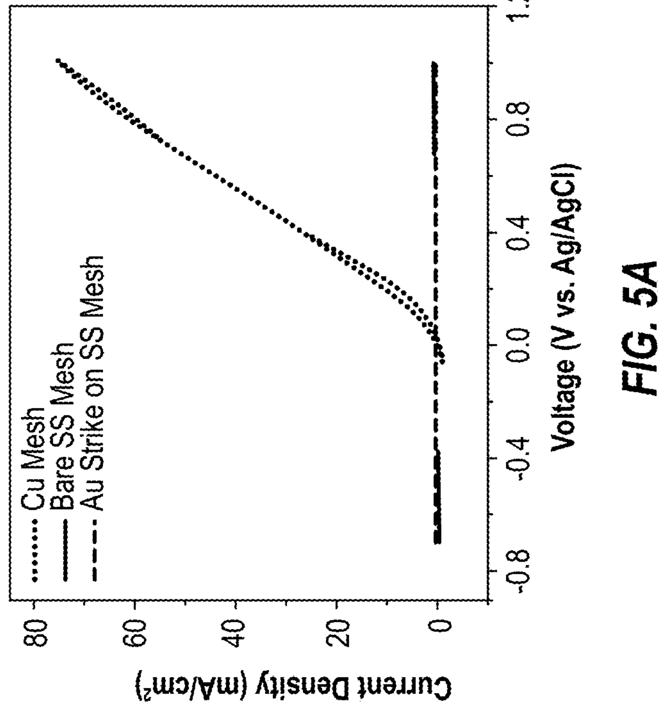

FIGS. 5A and 5B illustrate cyclic voltammograms (CV) using various meshes with FIG. 5A using a "blank" electrolyte and FIG. 5B using a full Cu—Bi electrolyte. The blank electrolyte includes 1M $LiClO_4$, 10 mM $HClO_4$, and 0.1% w/v % PVA while the full electrolyte additionally includes 10 mM $CuClO_4$ and 10 mM $BiOClO_4$. As shown in FIGS. 5A and 5B, the copper mesh shows an oxidative current beyond 0.1 V indicating oxidation. The stainless steel mesh, however, is chemically inert and possesses sufficient conductivity. Significantly higher conductivity would be offered by use of a copper or aluminum mesh. Additionally, the stainless steel mesh in the blank electrolyte (FIG. 5A) shows no Faradaic current in the same potential range indicating no electrochemical side reactions in the voltage range for RME dynamic windows.

FIG. 5A also shows the stainless steel mesh has no capacity to balance charge in an RME dynamic window due to its electrochemical inactivity. Therefore, embodiments may pre-deposit copper and bismuth via electrodeposition or other means (e.g., deposited via electrolytic, electroless, and/or immersive means) to the stainless steel or other metal mesh counter electrode allowing the counter electrode capacity to balance the working electrode. Additionally, the pre-depositing allows a symmetric electrochemical system where copper and bismuth can exist on both the working electrode and the counter electrode, therefore, eliminating degradative side reactions and reducing system complexities.

In some embodiments, a thin layer of electroplated metal can be deposited onto the stainless steel or other mesh counter electrode. The process of depositing such a thin layer of electroplated metal is also known as a "strike" or "striking" the counter electrode. In some embodiments, the striked counter electrode mesh exhibits improved metal electroplating and adhesion on the stainless steel or other core surface. In some embodiments, the metal striked on the counter electrode may include nickel, silver, gold, platinum, or other appropriate metals (e.g., a "noble" metal). In a particularly advantageous embodiment, the electroplated striking metal is gold.

In an embodiment, the gold or other noble metal strike on the stainless steel or other metal mesh counter electrode results in about a 0.2 μm increase in wire thickness (e.g., diameter). In some embodiments, the wire thickness may increase by less than about 0.1 μm, about 0.1 μm, about 0.2 μm, about 0.3 μm, or above about 0.3 μm. Additionally, the gold striked stainless steel mesh counter electrode showed improvements by decreasing the onset potential for copper bismuth deposition by 128 mV and decreasing the onset potential for copper bismuth stripping by 84 mV.

Figure 6A:
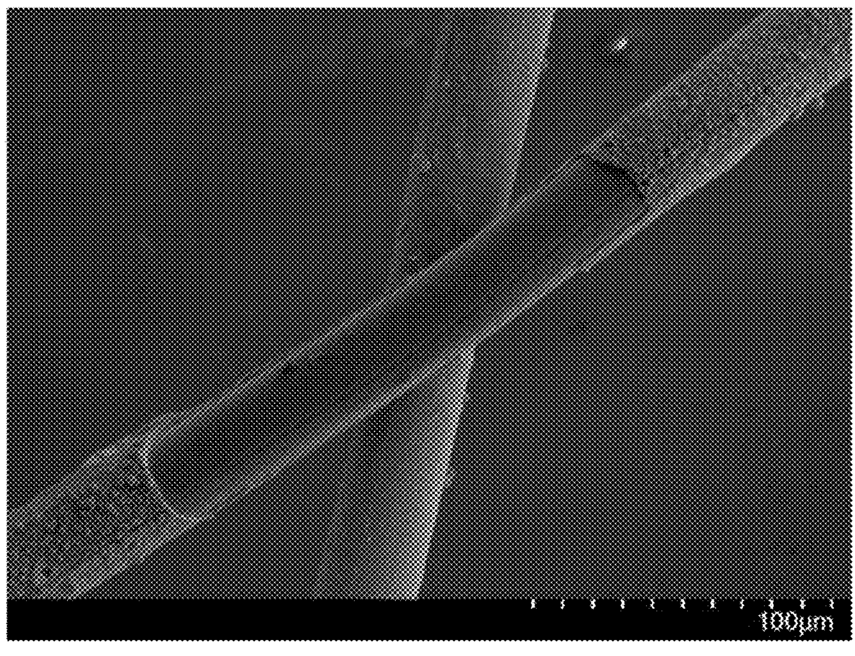
FIGS. 6A and 6B illustrate SEM images of different counter electrodes.
Figure 6B:
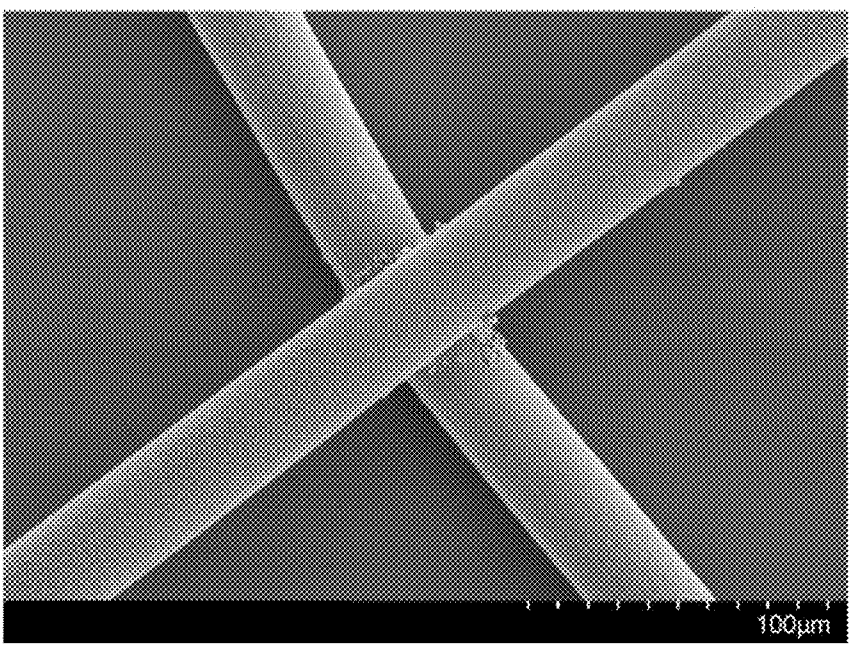

FIGS. 6A and 6B illustrate scanning electron microscopy (SEM) images of copper and bismuth electrodeposited onto a bare stainless steel mesh (FIG. 6A) and a gold striked stainless steel mesh (FIG. 6B), respectively. As shown, FIG. 5A shows sections on the stainless steel mesh that are not coated by the copper and bismuth (e.g., it flakes off, or does not fully adhere). In contrast, FIG. 5B shows a uniform, full, durable coating of copper and bismuth on the gold striked stainless steel mesh.

Experiments were performed to evaluate the transparency, haze, and capacity of the stainless steel mesh, gold striked stainless steel mesh, and an ITO electrode with plating up to 10× a privacy capacity of 0.1% VLT. It was shown that the metal mesh counter electrode materials exhibited high transparency, low haze, and high capacity. Results are shown in Table 2, below.

TABLE 2

| Substrate | Charge Capacity (mC cm$^{-2}$) | Transmission (%) | Haze (%) |
|---|---|---|---|
| Stainless Steel Mesh | 0 | 80.5 | 1.7 |
| Gold Striked Stainless Steel Mesh | 0 | 80.2 | 1.6 |
| ITO with 10x Privacy | 1500 | 78.8 | 0.8 |

As shown in Table 2, the 10× privacy capacity plated ITO electrode does not significantly decrease the transmission and shows a decrease in haze likely due to absorption of light from the black copper bismuth wire coating. In contrast, the gold striked stainless steel mesh electrode can be pre-loaded with copper and bismuth and serve as a sink for the copper and bismuth metal. The copper and bismuth sink allows the electrode to be reversibly electroplated without significantly affecting the clear state optics of the window. Additionally, the gold striked stainless steel mesh counter electrode may be plated with more metal than required to achieve a privacy state to reliably reach the privacy state after the first cycle.

FIGS. 7A-7C and 8A-8C show performance characteristics for various RME devices. Each set of Figures illustrates an example counter electrode in an RME dynamic window over 250 privacy cycles. The top graph (FIGS. 7A and 8A) illustrates the transmission percentage versus wavelength in nm, the middle graph (FIGS. 7B and 8B) illustrates the reflection transmission percentage versus wavelength in nm, and the bottom graph (FIGS. 7C and 8C) illustrates the coloration efficiency in cm$^2$/C as a function of cycle number. Coloration efficiency is defined as the change in transmission state divided by the charge passed for a given window area to achieve that transmission state. The coloration efficiency is a metric to determine how efficient an RME device blocks light. The arrows indicate the direction of window tinting and tinting was performed at −0.7 V and bleached at 0.7 V.

Figure 7A:
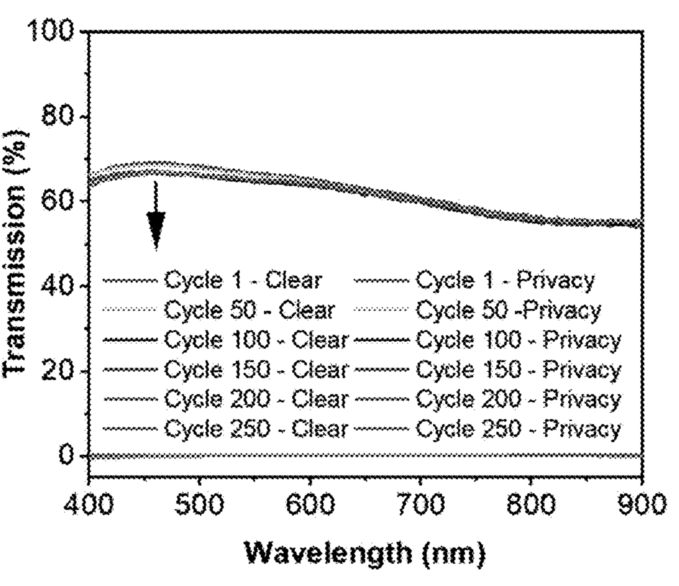
FIGS. 7A-7C illustrate experimental transmission (FIG. 7A) and reflectance (FIG. 7B) versus wavelength and coloration efficiency (FIG. 7C) versus cycle number for an exemplary copper mesh counter electrode.
Figure 7B:
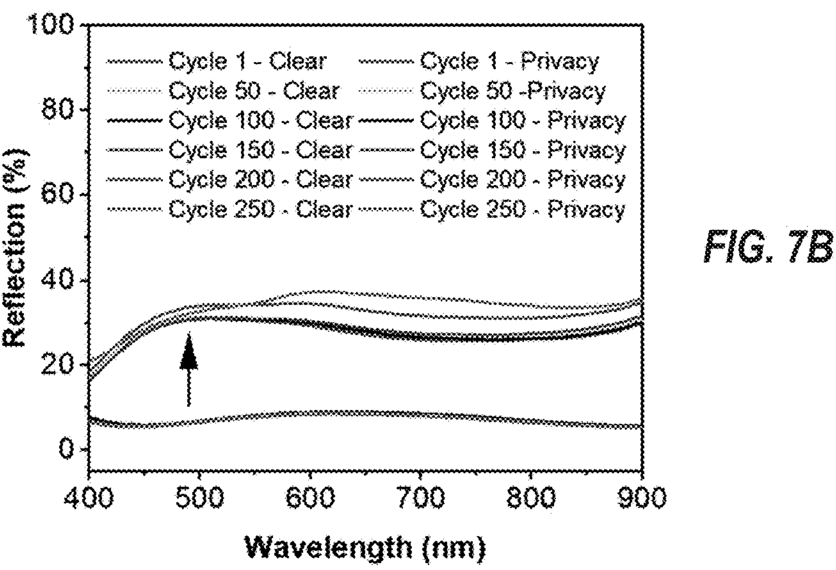
Figure 7C:
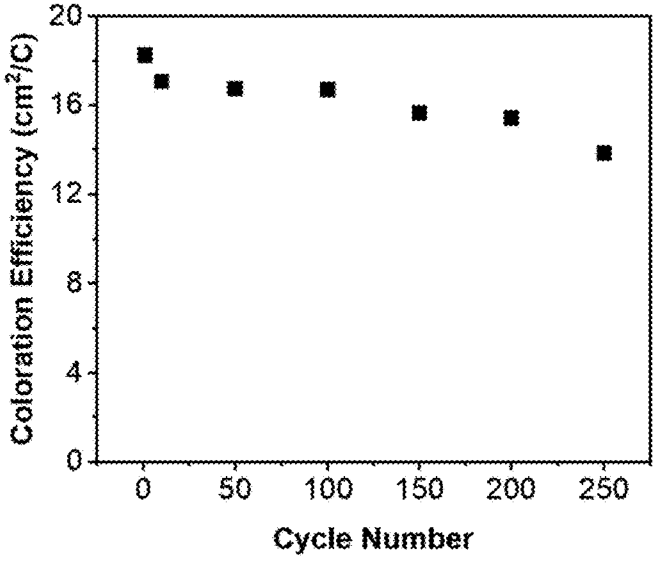

FIGS. 7A-7C illustrate results for an exemplary copper mesh counter electrode. One might consider using a copper mesh counter electrode due to low cost and high conductivity of copper. Experimental results shown in FIGS. 7A-7C show the copper mesh counter electrode achieves color-neutral tinting to privacy on cycle 1 by tinting the window at −0.7 V. FIGS. 7A-7C also show it takes 276 s to pass the 159 mC cm$^{-2}$. FIGS. 7A-7C also shows the copper mesh counter electrode maintains a color neutral privacy transmission state over 250 cycles. However, FIGS. 7A-7C show a peak at 550 nm in the reflection percentage by cycle 200.

FIGS. 7A-7C additionally show a coloration efficiency decay as a function of cycle number which drops from 18.3 cm$^2$/C on cycle 1 to 13.9 cm$^2$/C by cycle 250. The decrease in coloration efficiency indicates that charge passed cannot be used as a proxy for window transmission state which necessitates another mechanism for the user to know the transmission state of the dynamic window.

The growing peak in reflection and drop in coloration efficiency shown in FIGS. 7A-7C suggests an increase in $Cu^{2+}$ and more copper being plated from the electrolyte on the electrode. Additional experiments showed an initial ratio of copper and bismuth in the metal film of 3.2 and a ratio of 13.8 after 250 privacy cycles. The increase in the copper bismuth ratio confirms the increase in $Cu^{2+}$ and copper plating on the copper mesh counter electrode.

Figure 8A:
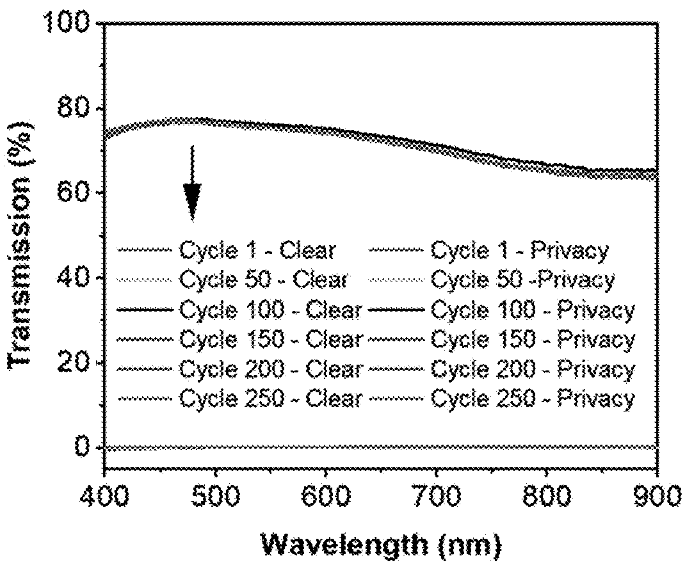
FIGS. 8A-8C illustrate experimental transmission (FIG. 8A) and reflectance (FIG. 8B) versus wavelength and coloration efficiency (FIG. 8C) versus cycle number for an exemplary gold striked stainless steel mesh counter electrode.
Figure 8B:
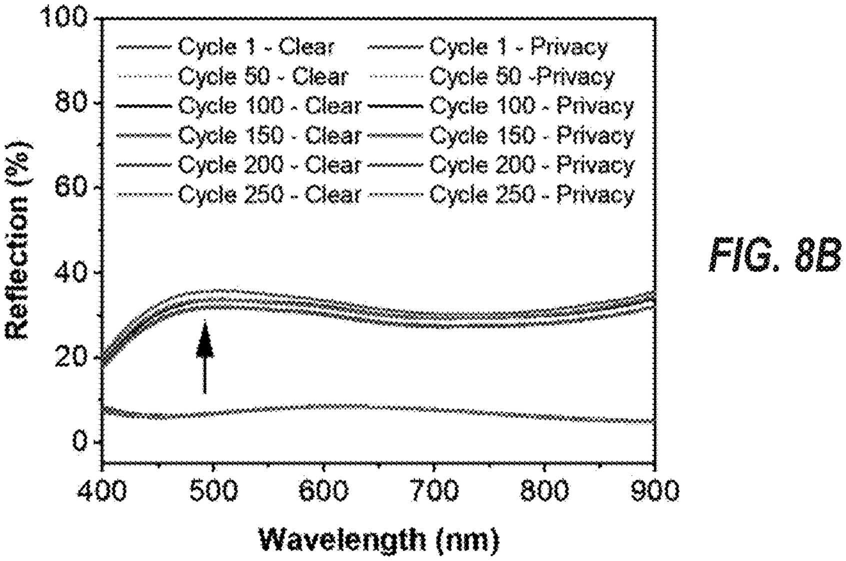
Figure 8C:
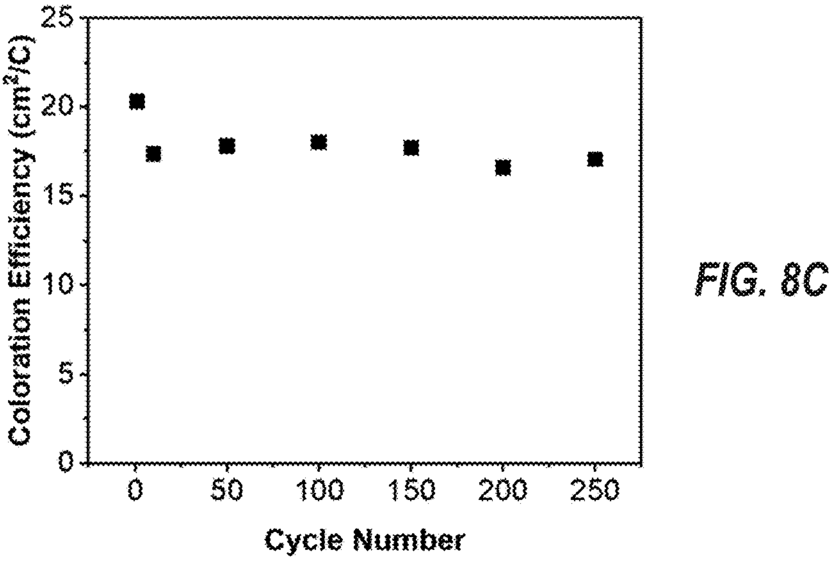

FIGS. 8A-8C illustrate results for an exemplary gold striked stainless steel mesh counter electrode which is pre-coated with copper and bismuth via electrodeposition with a 10× privacy capacity (e.g., capable of <<0.1% VLT) in an RME dynamic window. The clear state transmission shown in FIG. 8A is above about 70% at 550 nm, which is higher than commercially available electrochromic windows which exhibit a clear state transmission between 58% and 64%. Additionally, the RME device of FIGS. 8A-8C was tinted at −0.7 V and takes 224 seconds to pass 147 mC cm$^{-2}$. Gold striked stainless steel mesh counter electrode embodiments also show a stable color neutral privacy state over 250 cycles compared to copper mesh counter electrode embodiments which have a growing peak reflection starting at 550 nm and a continuous drop in coloration efficiency over extended cycling. FIGS. 8A-8C illustrate that the gold striked stainless steel mesh counter electrode embodiments maintain a consistent reflection profile over many cycles and maintain a consistent coloration efficiency of around 17.4 $cm^2/C$ after an initial drop from 20.3 $cm^2/C$ after 10 cycles.

Embodiments using the gold or other noble metal striked stainless steel mesh counter electrode simplify window design to an algorithm that can determine the transmission state of the window based on the amount of charge passed. Additionally, embodiments as described herein reduce the overall cost for the dynamic window. Additional experiments showed that the exemplary gold striked stainless steel mesh counter electrode exhibits a ratio of copper to bismuth of 4.8 after 250 cycles, which is still quite close to the initial ratio of 3.2. Such results are significantly better than the comparative embodiments that included a copper mesh, where the ratio of copper to bismuth drifted to 13.8 after 250 cycles. Such results indicate that the choice of counter electrode configuration plays a significant role in device durability.

Applicant's U.S. Patent Application No. 62/968,502 and PCT Application No. PCT/US2021/015851, each of which is titled ELECTROLYTE FOR DURABLE DYNAMIC GLASS BASED ON REVERSIBLE METAL ELECTRODEPOSITION, filed Jan. 31, 2020 and Jan. 29, 2021, respectively, is each herein incorporated by reference in its entirety. U.S. Patent Application Nos. 63/104,975 and Ser. No. 17/506,170 filed Oct. 23, 2020 and Oct. 20, 2021, respectively, each of which is titled "ELECTROLYTE ADDITIVE FOR CONTROLLING MORPHOLOGY AND OPTICS OF REVERSIBLE METAL FILMS," is each herein incorporated by reference in its entirety. U.S. Patent Application Nos. 63/330,140 and 63/432,534 and Ser. No. 18/298,967; filed Apr. 12, 2022; Dec. 14, 2022; and Apr. 11, 2023, respectively, each of which is titled "PULSED ELECTRODEPOSITION FOR REVERSIBLE METAL ELECTRODEPOSITION TO CONTROL METAL FILM MORPHOLOGY AND OPTICAL PROPERTIES," is each herein incorporated by reference in its entirety.

Additional Terms & Definitions

Features from any of the disclosed embodiments may be used in combination with one another, without limitation. For example, any of the compositional or other limitations described with respect to one embodiment may be present in any of the other described embodiments. In addition, other features and advantages of the present disclosure will become apparent to those of ordinary skill in the art through consideration of the following detailed description and the accompanying drawings.

While described principally in the context of windows, it will be appreciated that the present embodiments can be employed more broadly, e.g., in glass or plastic surfaces where dynamic tinting of the surface may be desired. Exemplary implementations include, but are not limited to windows, greenhouses, electric and other vehicles, transition sunglasses, goggles, tunable optics, clear-to-black monitors or other displays, adjustable shutters, IR modulators, thermal camouflage, and the like.

All publications, patents and patent applications cited herein, whether supra or infra, are hereby incorporated by reference in their entirety to the same extent as if each individual publication, patent or patent application was specifically and individually indicated to be incorporated by reference.

Unless otherwise stated, all percentages, ratios, parts, and amounts used and described herein are by weight.

Unless otherwise indicated, numbers expressing quantities, constituents, distances, or other measurements used in the specification and claims are to be understood as optionally being modified by the term "about" or its synonyms. When the terms "about," "approximately," "substantially," "generally" or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

Some ranges may be disclosed herein. Additional ranges may be defined between any values disclosed herein as being exemplary of a particular parameter. All such ranges are contemplated and within the scope of the present disclosure.

As used herein, the term "between" includes any referenced endpoints. For example, "between 2 and 10" includes both 2 and 10.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

In reference to various standardized tests, it will be understood that reference to any such standard refers to the latest update (if any) of such standard, unless otherwise indicated. Any such referenced standards are incorporated herein by reference, in their entirety.

The present disclosure can be embodied in other specific forms without departing from its spirit or essential characteristics. Thus, the described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A dynamic window article capable of reversible metal electrodeposition, comprising:

a transparent conductive electrode;

an electrolyte in contact with the transparent conductive electrode, the electrolyte comprising metal cations that can be reversibly electrodeposited onto the transparent conductive electrode; and a mesh counter electrode, wherein the mesh counter electrode comprises a plurality of wires forming the mesh, where each wire includes an electrochemically inert core coated with an electrochemically active metal, wherein the mesh counter electrode is substantially transparent, wherein the mesh counter electrode provides a figure of merit of at least 350.

2. The article of claim 1, wherein the mesh counter electrode includes wires that are substantially cylindrical.

3. The article of claim 1, wherein the mesh counter electrode has a charge capacity of at least 1 $C \cdot cm^{-2}$, at least 1.2 $C \cdot cm^{-2}$, at least 1.3 $C \cdot cm^{-2}$, at least 1.4 C·cm 2, or at least 1.5 $C \cdot cm^{-2}$.

4. The article of claim 1, wherein the inert core comprises at least one of stainless steel, copper or aluminum.

5. The article of claim 1, wherein at least some wires of the wire mesh further comprise an intermediate coating layer, between the inert core and the electrochemically active metal coating.

6. The article of claim 5, wherein the intermediate coating layer comprises a noble metal.

7. The article of claim 6, wherein the noble metal comprises gold.

8. The article of claim 1, wherein the electrochemically active metal comprises both copper and bismuth.

9. The article of claim 1, wherein the electrochemically active metal comprises the same metals that are in the electrolyte, that are involved in electrodeposition.

10. The article of claim 1, wherein the electrolyte does not include redox shuttles.

11. The article of claim 1, wherein the counter electrode does not employ ion intercalation.

12. The article of claim 1, wherein the mesh counter electrode is a free standing mesh, a mesh formed through an additive printing process, or a mesh formed through a subtractive printing process.

13. The article of claim 1, wherein the mesh counter electrode provides a haze of less than about 5 percent.

14. The article of claim 1, wherein the mesh counter electrode provides a sheet resistance of less than about 3 $\Omega \square^{-1}$.

15. The article of claim 1, wherein the mesh counter electrode has a transparency of at least about 70%.

16. The article of claim 1, wherein the mesh counter electrode provides a figure of merit of at least 500.

17. The article of claim 1, wherein the mesh counter electrode provides a figure of merit of at least 1000.

18. The article of claim 1, wherein the mesh counter electrode has a transparency of at least about 75%.

19. The article of claim 1, wherein the mesh counter electrode has a transparency of at least about 80%.

20. A dynamic window article capable of reversible metal electrodeposition, comprising:

a transparent conductive electrode;

an electrolyte in contact with the transparent conductive electrode, the electrolyte comprising metal cations that can be reversibly electrodeposited onto the transparent conductive electrode; and a mesh counter electrode, wherein the mesh counter electrode comprises a plurality of wires forming the mesh, where each wire includes an electrochemically inert core coated with an electrochemically active metal, wherein the mesh counter electrode is substantially transparent;

wherein at least some wires of the wire mesh further comprise an intermediate coating layer, between the inert core and the electrochemically active metal coating, wherein the intermediate coating layer comprises gold.

* * * * *